US007568098B2

(12) United States Patent
Yeates et al.

(10) Patent No.: US 7,568,098 B2
(45) Date of Patent: Jul. 28, 2009

(54) SYSTEMS AND METHODS FOR ENHANCING SECURITY OF COMMUNICATION OVER A PUBLIC NETWORK

(75) Inventors: Anthony Yeates, Redmond, WA (US);
Pavel Dournov, Redmond, WA (US);
Donna Whitlock, Seattle, WA (US);
Timothy Belvin, Auburn, WA (US);
Brendan O'Meara, Bellevue, WA (US);
Kirk Blackwood, Bellevue, WA (US);
Derrick Bazlen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 10/725,881

(22) Filed: Dec. 2, 2003

(65) Prior Publication Data

US 2005/0120214 A1    Jun. 2, 2005

(51) Int. Cl.
 *H04L 9/00* (2006.01)
(52) U.S. Cl. .......................................... 713/171; 726/10
(58) Field of Classification Search ................. 713/156, 713/171, 1, 175, 155, 168; 726/10, 9; 380/277, 380/281, 282
See application file for complete search history.

(56) References Cited

U.S. PATENT DOCUMENTS

| 7,434,252 | B2 * | 10/2008 | Ballinger et al. ............... 726/10 |
| 2001/0027527 | A1 * | 10/2001 | Khidekel et al. ............ 713/201 |
| 2002/0023208 | A1 * | 2/2002 | Jancula ....................... 713/156 |
| 2002/0031230 | A1 * | 3/2002 | Sweet et al. ................. 380/278 |
| 2003/0115341 | A1 * | 6/2003 | Sinha et al. .................. 709/229 |
| 2005/0050317 | A1 * | 3/2005 | Kramer et al. ............... 713/155 |
| 2007/0033644 | A1 * | 2/2007 | Thomas et al. ................ 726/10 |

OTHER PUBLICATIONS

Bellare, Mihir. Et al. "Authenticated Key Exchange Secure Against Dictionary Attacks." *Advances in Crytology*. vol. 1807, 2000. pp. 139-155.
Bellovin and Meritt, Steven M. and Michael. "Augmented Encrypted Key Exchange: (A) Password-Based Protocol Secure Against Dictionary Attacks and Password File Compromise", *Proceedings of the 1st (ACM) Conference on Computer and Communications Security*. Nov. 1993. pp. 244-250.
Park, Joon S. et al. "RBAC on the Web by Secure Cookies", 1999. 14 pgs.
Park, Joon S. et al. "Role-Based Access Control on the Webt Using LDAP", 1999, pp. 1-12.
Fu, Kevin et al. "Dos and Don'ts of Client Authentication on the Web", Aug. 2001. pp. 1-16.
Samar, Vipin. "Single Sign-On Using Cookies for Web Applications",1999. 6 pgs.
Morgan, Jeff et al. "Secure Web Access in an Environment of Mutual Distrust", Courant Institute of Mathematical Sciences, New York University, 2001. pp. 1-23.

(Continued)

*Primary Examiner*—Beemnet W Dada
(74) *Attorney, Agent, or Firm*—Westman, Champlin & Kelly, P.A.

(57) ABSTRACT

An authentication protocol is disclosed for use in enhancing the security of communications between software applications and Internet-based service providers. The protocol incorporates a two level authentication model based on a distribution of authentication responsibilities, wherein the application authenticates users and the service provider authenticates the application. Embodiments of the protocol incorporate public key infrastructure and digital certificate technology. Other embodiments of the present invention pertain to applying a corresponding protocol to peer-to-peer communication scenarios.

15 Claims, 10 Drawing Sheets

OTHER PUBLICATIONS

Goldstein, Andy et al. "The Digital Distributed System Security Architecture", Reprint National Computer Security Conference, Jan. 1989, pp. 1-13.

Dalton, Chris I. Et al. "Secure Partitioned Access to Local Network Resources Over the Internet", Copyright Hewlett Packard Company 1998. pp. 1-23.

Beresnevichiene, Yolanta. "A Role and Context Based Security Model" Technical Report, University of Cambridge, Jan. 2003, pp. 1-89.

Brucker, Achim D. et al. "The (CVS) Server Case Study: (A) Formalized Security Architecture, *FM-Tools 2002*" Jul. 2002, pp. 47-52.

\* cited by examiner

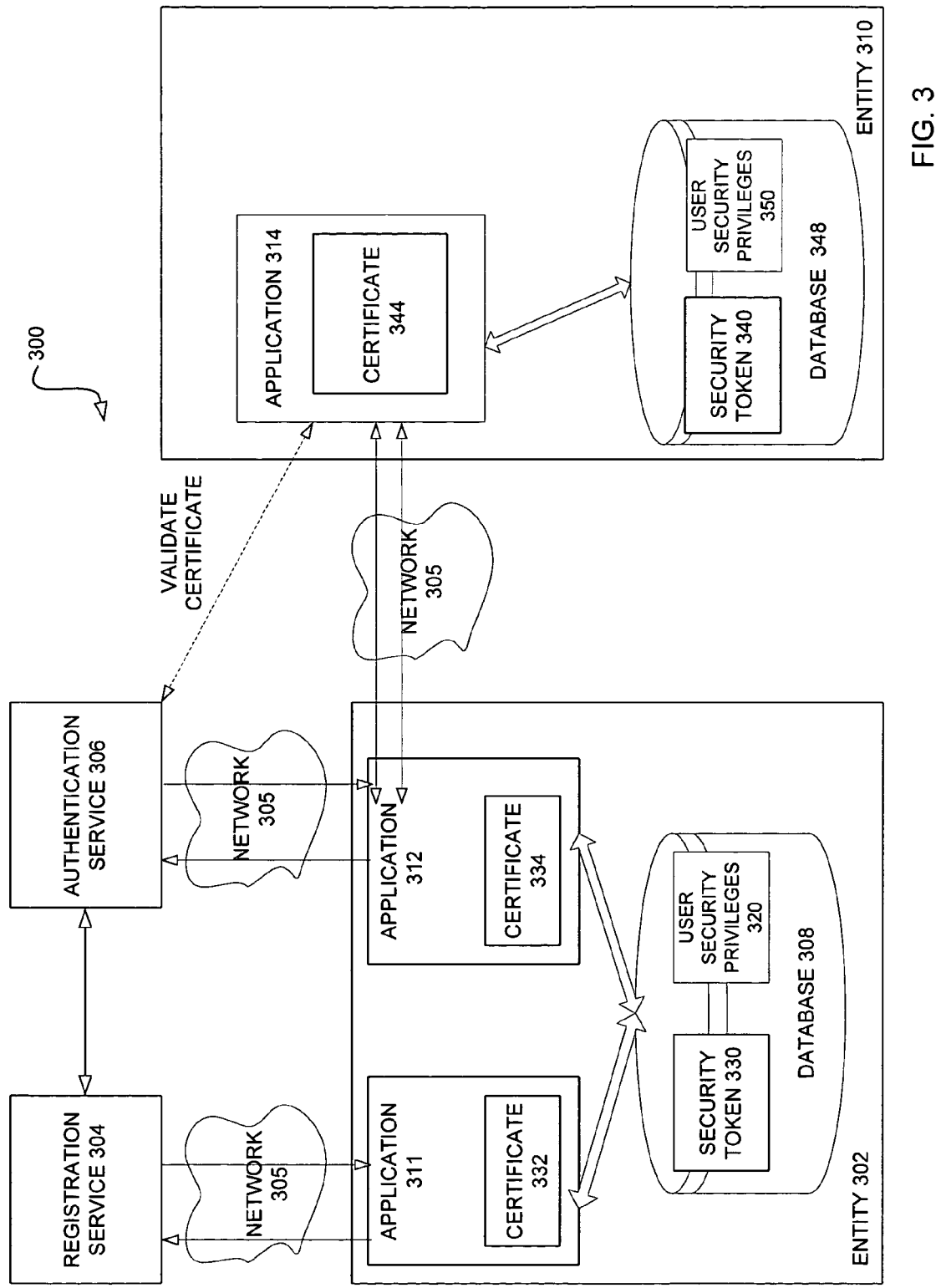

SYSTEMS AND METHODS FOR ENHANCING SECURITY OF COMMUNICATION OVER A PUBLIC NETWORK

BACKGROUND OF THE INVENTION

The present invention generally pertains to systems and methods for enhancing the security of communication over a public network. More specifically, the present invention deals with implementation of security measures for software applications communicating with remote service providers, as well as within peer-to-peer networks.

Given advancements in computer networking technology, the functionality of a given software application can be extended through remotely provided services offered through a public network such as the Internet. Communication between the application and the provider of services should be effectively secured so as to protect the interests of both the host of the application and the sponsor of the services.

Retail management systems are an area where the challenge of securing remote service communication has presented itself. In order to achieve some degree of automation, retail businesses often implement a specialized software application. Many of these applications are point-of-sale solutions that enable at least partial automation of any of a number of processes such as customer tracking and inventory management. One example of such an application is the Microsoft Retail Management System (MRMS) provided by Microsoft Corporation of Redmond, Wash.

It is common for retail management software applications to be installed on multiple computers connected by a Local Access Network (LAN) that works in conjunction with a central database. In some instances, extended functionality is available to the local network applications in the form of web services delivered by a service provider through the Internet. Such extended functionality may include, by way of example, payment card processing, integration with e-commerce web hosting, or merchandising services. These and other services may be provided for free or based on a payment scheme involving subscription or per access based charges.

Data and communication security are important areas of consideration for the described and other remote service systems. For example, communication between an application and a provider of services should be protected from hacking, spoofing and other forms of unauthorized tampering. Further, it is important that business data exchanged between an application and provider of services be transported in a secure manner.

The authentication and authorization of application users are additional factors to consider in the context of remote service systems. Within such systems, it becomes desirable for an application host to distribute access rights (e.g., rights to access remotely provided services and/or perform administrative tasks) to users in some customized manner (e.g., different employees or employee roles are assigned different access rights). One possible way to implement a customized distribution of access rights is to replicate a list of user accounts on both peers. Under these circumstances, the web service provider possesses user identification information and thus is in a position to perform user authentication and authorization. However, this method requires a continuous synchronization of multiple copies of user access lists.

The security challenges confronting remote communication with software applications are not reserved to the described remote service environments. Another way to extend the functionality of an application is through peer-to-peer communication between multiple networked applications connected to one another, for example, by a public network such as the Internet. In order for multiple applications to securely intercommunicate within such an environment, inter-application communication should be effectively secured so as to protect the interests of the application hosts.

The challenge of securing peer-to-peer communication is also practically relevant in the context of retail management systems. For example, it is common for a business owner to have multiple stores operating software applications that require periodic communication with one another for any of a variety of reasons, such as to exchange product information, transfer business documents, or send sales data for consolidated reporting. In some cases, the inter-store communication will occur automatically, or at least semi-automatically, with little or no user interaction. Especially when this type of peer-to-peer communication is to occur over a public network, communication security should be carefully considered and accounted for.

In another example of a practical peer-to-peer scenario, owners of different stores are occasionally interested in some kind of intercommunication involving limited access to business data. For example, owners of retail stores sometimes allow certain partners to browse portions of their current inventory to check item availability. This creates a demand for support of small peer partner networks. Within such networks, communication security becomes important to enable secure exchanges of data between trusted partners. Also, similar to the access customization features described in the web services context, it becomes desirable to define security policies that can prescribe different data access restrictions for different partners, and to apply those policies to incoming requests from trusted sources.

Generally speaking, security is a key challenge in the implementation of a remote communications model for software applications. Despite well established basic technologies in this area, such as SOAP Web Services, GXA and Web Service Enhancements, there is an absence of a generic end-to-end security prescriptive architecture ready for software applications to adopt. There is a need for a solution that can dynamically extend software application functionality through secure connection to subscription based web services, and/or to compatible applications in peer-to-peer networks. Within this context, there is also a need for a system that will enable control over rights to access application resources and accounts.

SUMMARY OF THE INVENTION

Embodiments of the present invention pertain to a communication protocol to be implemented between a software application and a remote service provider. The protocol generally involves downloading a long-lasting security certificate during the process of registering the software application. An access ticket, which is encrypted based at least in part on information contained in the long-lasting security certificate, is generated to enable a particular person (or a particular class of persons) to access a particular service (or services) from the provider of services during a period of time within which the access ticket is valid. The scope of permission (e.g., assigned roles, assigned user classes, grouping of services, etc.) and the duration of access authorization (e.g., minutes, days, weeks, etc.) can be configured (and re-configured) by the host of the software application (e.g., an authorized representative of the host) on a case-by-case basis depending on current security and performance needs. Other embodiments of the present invention pertain to utilization of a corresponding protocol to enhance the security of peer-to-peer communication, for example, communication between two software applications that communicate over a public network.

BRIEF DESCRIPTION OF THE DRAWINGS

FIG. 3 is a schematic block diagram of a communication security environment;

DETAILED DESCRIPTION OF THE PREFERRED EMBODIMENTS

It should be noted that to the extent that the present invention is described in the context of retail management and retail management applications, this is just one example of an applicable context provided for the purpose of illustration to facilitate description. The present invention is not so limited.

I. Illsutrative Computing Environments

Prior to describing the present invention in detail, embodiments of illustrative computing environments within which the present invention can be applied will be described.

Figure 1:
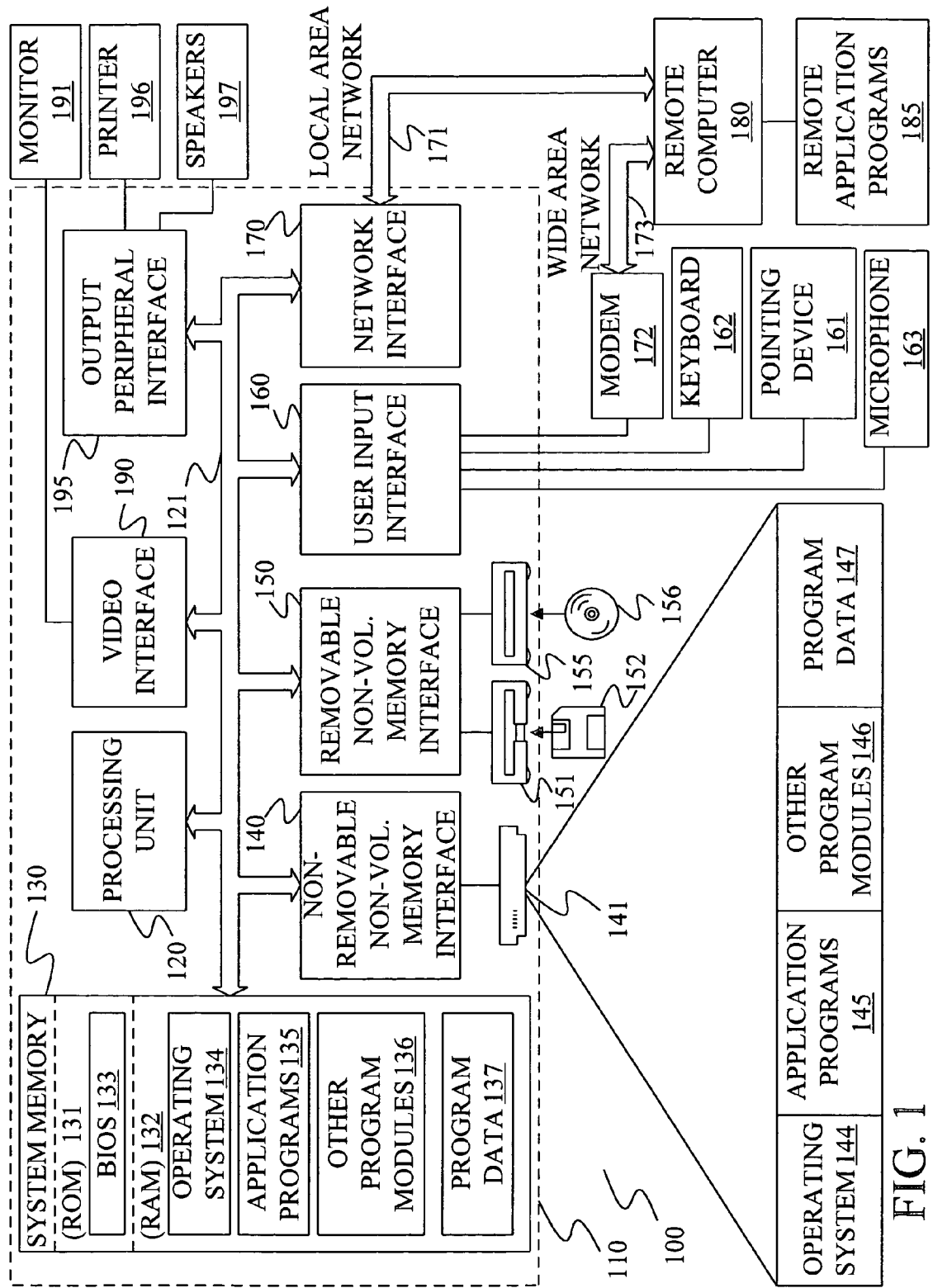
FIG. 1 is a schematic block diagram of a computing environment.

FIG. 1 illustrates an example of a suitable computing system environment 100 within which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, tablet computers, mainframe computers, distributed computing environments that include any of the above systems or devices, and the like. Other suitable examples include various retail-oriented devices such as, but not limited to, self-checkout systems, point-of-sale terminals, self-service kiosks, Electronic Cash Registers, and Electronic Payment Terminals (e.g., veriphone terminals).

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, touch-sensitive screen, magnetic strip reader, magnetic ink check reader, smart card reader, RFid/AutoID reader, Bar-code scanner, number pad, electronic payment terminal (stand alone or connected to a terminal—e.g., via a network, USB or serial connection), electronic weighing scale, biometric security input device (e.g., eye scanner, thumb print reader, etc.), or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks such as wireless networks. Such networking environments are commonplace in offices, enterprise-wide computer networks, intranets and the Internet. Applicable wireless networks also include, but are not limited to, wireless LANS/Wi-Fi, and also IP over cellular (telephone) communications networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. Illustrative Application Environments

The present invention is not limited to any particular application environment. However, for the purpose of providing exemplary context, a few illustrative application environments within which embodiments of the present invention can be applied will now be described.

Figure 2A:
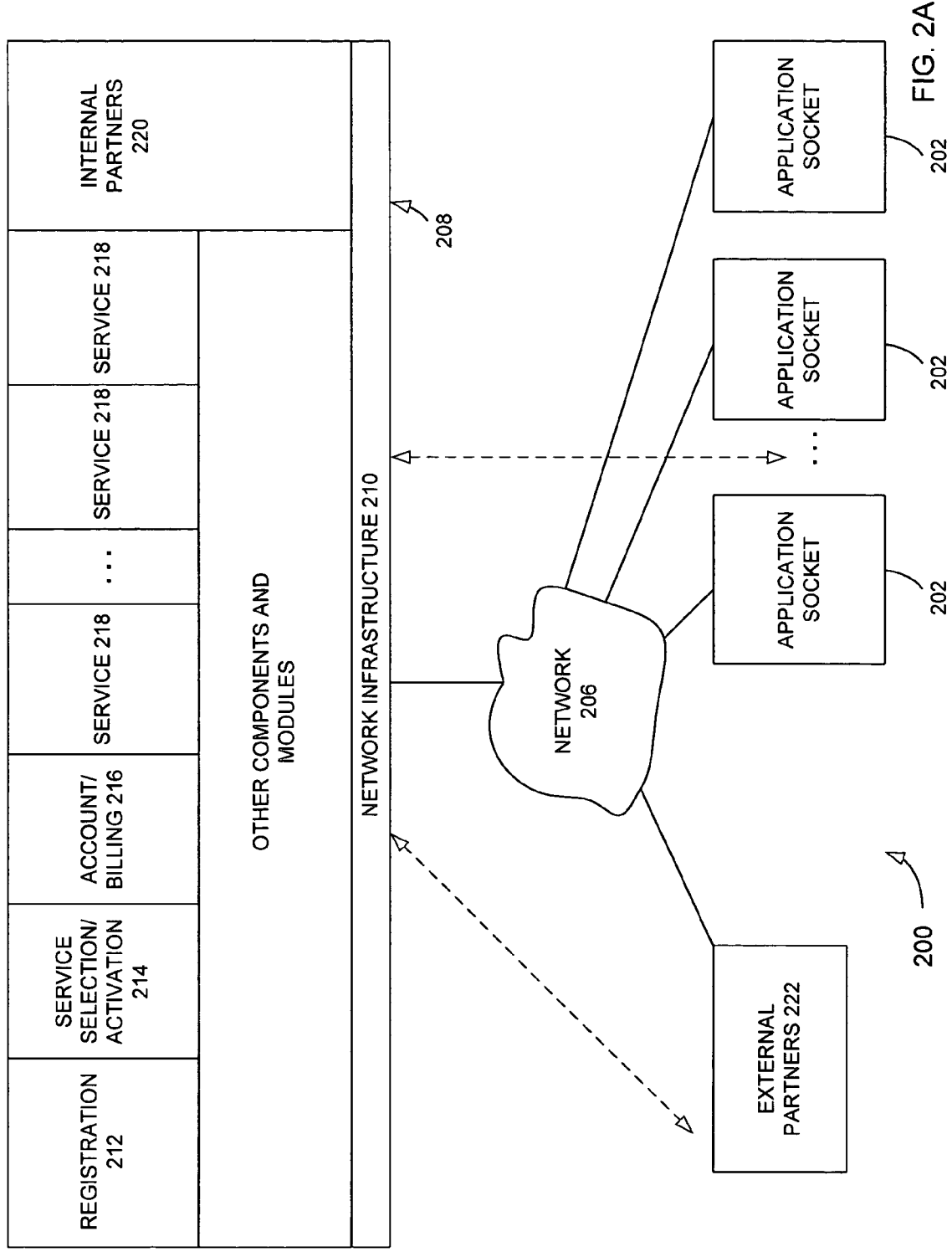
FIGS. 2A-2C are schematic block diagrams of three different application environments.

FIG. 2A is a block diagram of an application environment 200 that includes a web service provider 208 configured to provide functional enhancements to a remotely situated software application. The software application is illustratively implemented on a plurality of computing devices (specific devices discussed in relation to FIG. 1) identified as application sockets 202. Web service provider 208 and sockets 202 are communicably connected to one another through a public network 206 (e.g., the Internet).

Web service provider 208 includes a network infrastructure 210 for facilitating incoming and outgoing communication. Provider 208 also includes a registration module 212 that enables an application host to register themselves and/or their application. A service selection/activation module 214 enables the host to select, activate, and/or deactivate a delivery of services. An account/billing module 216 enables a billing process in order to charge the application host for activated services.

Deliverable services have been labeled 218 in FIG. 2A. Some of services 218 are associated with, or delivered on behalf of, one or more internal partners 220. Other of services 218 are associated with, or delivered on behalf of, external partners 222. Services are provided through the application interface by way of application sockets 202.

In accordance with one embodiment, a business retailer purchases a retail management application and installs it in sockets 202. The term "socket", as it is used herein, is intended to describe a device (e.g., any device described in relation to FIG. 1) connected to a network (e.g., the Internet) directly or indirectly. Sockets will be described herein as running a software application, such as a retail management application. It should be noted that more than one relevant application can be run on a given socket, and a given socket may or may not run any particular application.

One or more of sockets 202 may be set up to run a point-of-sale client application, while another may run an administrative client application provided, for example, for management purposes (e.g., to a headquarters location). An authorized representative of the retailer illustratively interacts with registration module 212 through network 206 to register the business and/or application. The representative then interacts with module 214 to selectively configure the provision of retail merchant services 218 which may include, but are not limited to, services such as payment services, banking services, gift card services, business administration services, billing services, and the like. Services 218 are then provided through network 206 on behalf of partners 220/222. The retail business is then billed for services in conjunction with billing module 216. An authorized representative can subsequently interact with module 214 to customize the delivery of services.

Figure 2B:
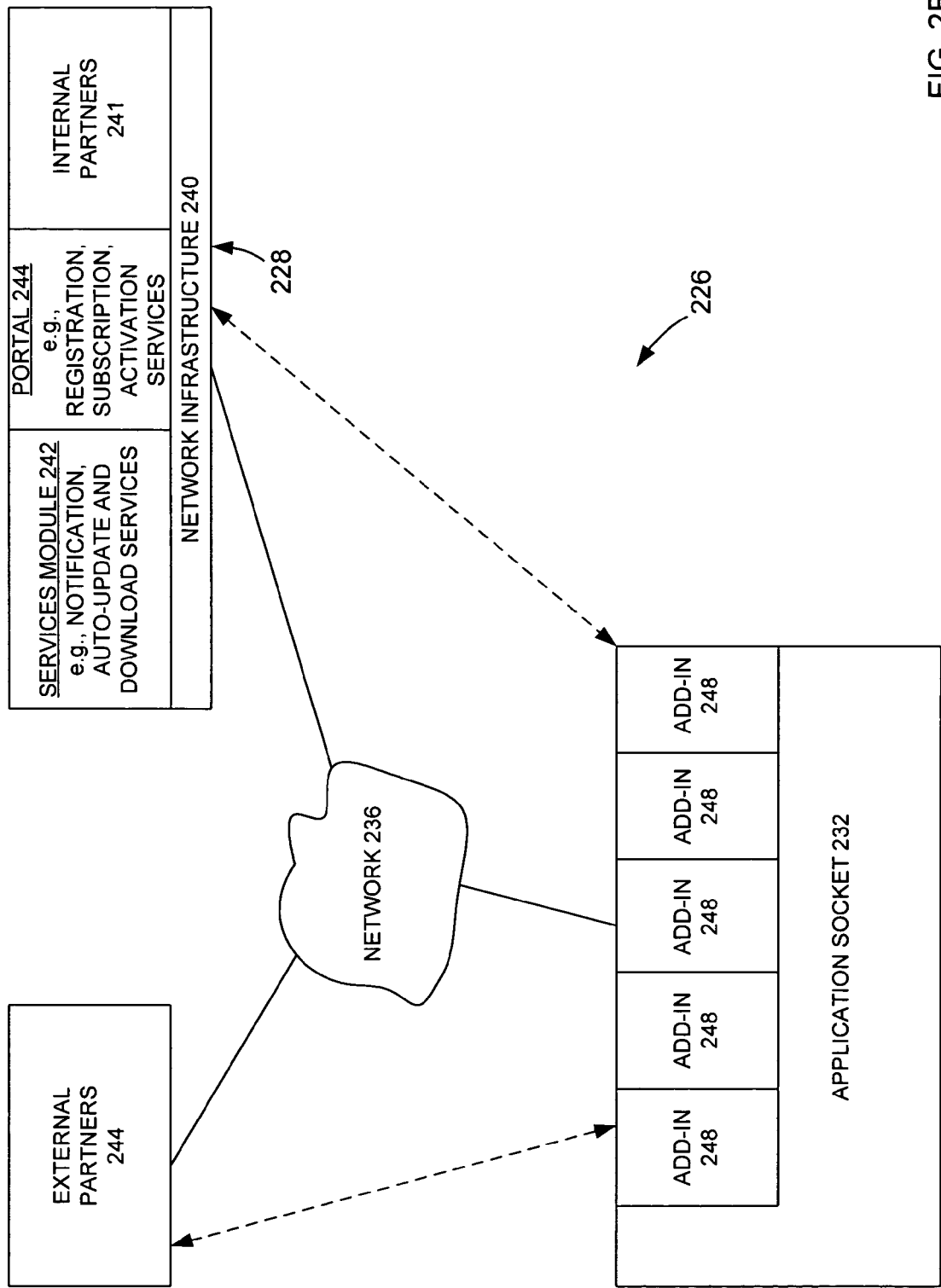

FIG. 2B is a block diagram of an application environment 226 that includes a service add-in provider 228 configured to provide services in the form of program supplements or add-ins for an application. Within system 226, the application is illustratively implemented on a computing device corresponding to application socket 232. The system could just as easily include distribution across multiple sockets as was described in relation to FIG. 2A. Add-in provider 228 and socket 232 are communicably connected to one another through a public network 236 (e.g., the Internet). Add-in provider 228 includes a network infrastructure 240 for facilitating incoming and outgoing communication. Add-ins already transferred by provider 228 are labeled 248 in FIG. 2B.

Add-in provider 228 includes a service module 242 configured to notify application hosts of available add-ins and/or to automatically provide certain add-ins. Add-in provider 228 also includes an interface portal 244 for facilitating registration, subscription and activation functionality similar to that described in relation to FIG. 2A. Although not illustrated specifically, add-in provider can also include account/billing functionality to facilitate the process of billing for add-ins.

Some of the add-ins 248 provided by add-in provider 228 are associated with, or delivered on behalf of, one or more internal partners 241. Other add-ins are associated with, or delivered on behalf of, external partners 244. The delivered add-ins 248 are illustratively integrated into the application operating in application socket 232.

In accordance with one embodiment, a business retailer purchases a retail management application and installs it in socket 232. Then, an authorized representative of the retailer interacts with portal 244 through network 236 to register the business and/or application. The representative then interacts with module 242 to selectively configure the provision of add-ins 248. Billing can be configured on a subscription, transactional or any other basis. Add-ins 248 are then provided through network 236 on behalf of partners 241/244. The retail business may illustratively be billed for at least some delivered add-ins 248. Add-ins 248 may enable any of a variety of extended retail functions, and may include application updates and the like.

It should be noted that it is within the scope of the present invention that some systems be a combination of the environments illustrated in FIGS. 2A and 2B. For example, a system could be configured wherein both add-ins and services are delivered by a provider to an application.

Figure 2C:
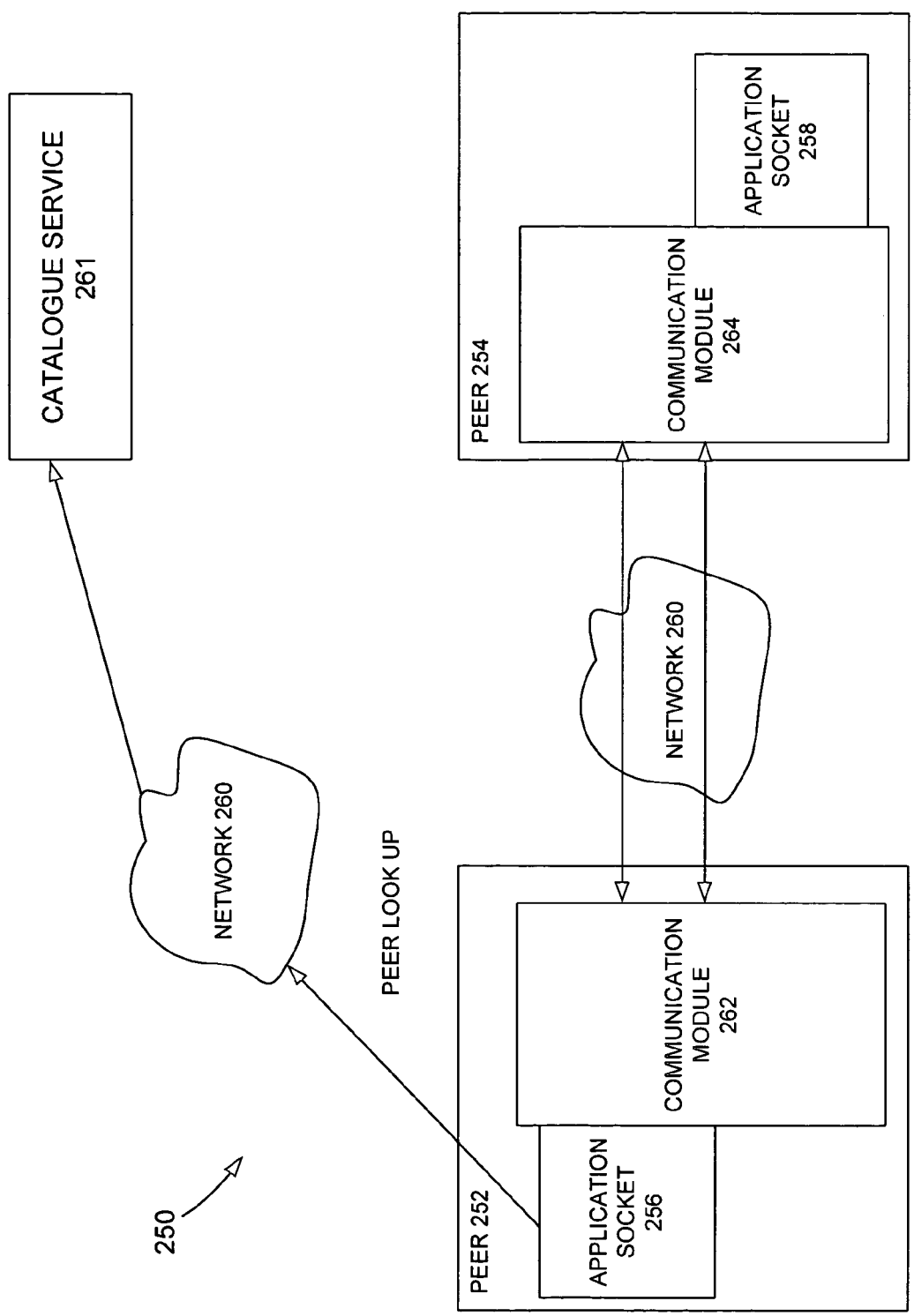

FIG. 2C is a block diagram of an application environment 250 wherein communication between two peers 252 and 254 is desired. In particular, communication between two independent applications associated with sockets 256 and 258 is desired. In accordance with one embodiment, peers 252 are related in some way, such as stores having a common owner. In accordance with another embodiment, however, the motivation for intercommunication is fueled by one of the peers becoming aware of the other through any means such as, but not limited to word-of-mouth or through information provided by a catalogue service 261 over a public network 260 (e.g., the Internet). Peers 252 and 254 each include a communication module, 262 and 264 respectively, to facilitate intercommunication over network 260.

III. Securing Application Communications

Each of the environments described in relation to FIGS. 2A-2C includes a software application that incorporates communication over a public network. Security becomes an issue when extending a local software application to use remote commercial services (including add-in services), or to communicate with remote applications. Embodiments of the present invention provide solutions that enhance security for both application-to-remote-services and application-to-application interactions over any network (public or otherwise). In accordance with one aspect of the present invention, the same solutions can be extended to secure any client-server communication model, or any peer-to-peer communication model.

A. Security Environment Overview

FIG. 3 is a block diagram of a communication security environment 300 in accordance with embodiments of the present invention. An entity 302, which is illustratively but not necessarily a business organization, includes applications 311 and 312 installed in separate sockets. Applications 311 and 312 are illustratively, but not necessarily, different instances of the same application. Applications 311 and 312 are configured to store and retrieve data in conjunction with a database 308.

Applications 311/312 are configured for communication across a network 305 with a registration service 304 and an authentication service 306. Within FIG. 3, for the purpose of illustration, only application 311 is shown in communication with registration service 304, and only application 312 is shown in communication with authentication service 306. Applications 311/312 can optionally be further configured for communication across network 305 with an application 314 maintained by a separate entity 310, which is illustratively but not necessarily a business organization. Within FIG. 3, for the purpose of illustration, only application 312 is shown in communication with application 314.

B. Web Service Registration Overview

Registration service 304 and authentication service 306 are illustratively associated with a remote provider of services (not illustrated). In accordance with one aspect of the present invention, a system administrator (e.g., an owner of entity 302, a manager employed by entity 302, etc.) registers with registration service 304 in order to open the possibility of extending the functionality of applications 311/312 through a delivery of services. In accordance with one embodiment, service 304 verifies an application license for application 311 and/or application 312 (e.g., a unique registration key assigned to an application at installation). The registration process illustratively results in creation of an entity account for entity 302. An entity account identifier is illustratively provided during the registration process and is designed for use as identification. The account identifier could take any of a variety of forms including a merchant identifier or a security token 330, which will be described in detail below.

In accordance with one embodiment, during the registration process, a list of users who are authorized to perform administrative tasks is established. Following registration, a user on the list who can sufficiently authenticate their identity is able to interact with the web service provider to perform administrative tasks, such as to activate or deactivate available web services (e.g., begin or end service subscriptions).

In accordance with one embodiment, an "authorized" user, as that term is used throughout the present description, is a user that has a predetermined level of authority that can be demonstrated through a pre-established system for authentication of personal identification. Any means of authentication is within the scope of the present invention, including any means of informational or physical authentication, or a combination thereof (e.g., biometric authentication, smart card authentication, password authentication, etc.). In accordance with one embodiment, one can demonstrate proper "authorization" by successfully logging into an identification/password system and proving inclusion on a list of authorized users, such as a list established during the registration process.

In accordance with one embodiment, one can demonstrate "administrative authorization" by successfully logging in with a centralized web-based service that enables multiple participating sites to authenticate a user with a single set of sign-in credentials, eliminating the need for a user to remember numerous passwords and sign-in names. For example, the user can log-in utilizing MS-Passport (or NET Passport) offered by Microsoft Corporation of Redmond, Wash. Sites utilizing this type of centralized authentication service can grant access based on an inclusion (or absence) of a given logged-in user on a list of users that are "authorized" to perform one or more predetermined administrative tasks.

C. Customized User Security Privileges

In accordance with one aspect of the present invention, an application operates in conjunction with a security subsystem that manages a list of application-specific user accounts, application resources/privileges, and mappings between entries in these two categories of access rights. This illustratively constitutes the boundary of the application "security context." Within the application security context, users and resources are identified, and corresponding security restrictions are enforced. In broad terms, the security context is a span of control over the rights to access application resources as they relate to user accounts or user roles. It should be noted however that it is also within the scope of the present invention to distribute resources/privileges based on other parameters (e.g., based on workstation or entity identification). An example of access privileges being assigned based on user roles is a scenario wherein all users of a certain role (e.g., cashiers) are given a same username/password combination that is associated with one set of access privileges.

With regard to system 300, for each activated web service, and optionally for access rights corresponding to one or more administrative tasks, a set of security privileges 320 is maintained. Security privileges 320 enable applications 311/312 to police access rights for various individual users. Users illustratively have login accounts or roles to which specific security privileges are assigned. Security privileges 320 are maintained in database 308 and accessed as necessary to monitor system use.

An authorized user, such as an application administrator or manager employed by entity 302, is illustratively empowered to configure security settings 320 to selectively grant access privileges to appropriate application users and/or user roles. For example, for a credit card payment service offered by the web service provider, perhaps only certain users (e.g., supervisors) are empowered to perform credit card transaction settlements. Accordingly, the login accounts or roles of those users are assigned the corresponding privileges.

After the registration and service activation processes are complete, and after user security privileges 320 have been established, the features of activated services are available through their application counterpart in light of the security privileges assigned to a particular logged-in user or user role. In accordance with one embodiment, an extended functionality furnished by the web service provider is available automatically and in a seamless manner as if it were built into the application, such that no additional logins are necessary. Accordingly, the process of user authentication need be performed only once, although re-authorization may be required following expiration of a predetermined period of time, or following a log-out of a current user.

Secure communication between an application and a remote provider of services (or with other sockets) can require a security context for each of the communicating parties to be integrated to some extent. For example, given the described service provider communication scenario, there is an issue in defining which and what type of client application resources the service provider should be able to identify and apply security policies to. One possible way to integrate the application security context with a service provider is to replicate the list of user accounts on both sides of communication so that the service will know user identifications and will be able to perform authentication and authorization against its own resources. This, however, requires continuous synchronization of user access lists.

The present invention provides an alternate solution to the integration issue. In accordance with one part of the solution, upon a valid user authentication enabling access to a remote service, details of the valid authentication, as well as a corresponding user identifier (e.g., a log-in name) are made available to resource managers both in the local client application as well as in the web service provider "cloud". While this process eliminates the need for user authentication at the web service provider, the user's account data is still required to perform authorization. To address this issue, in accordance with one embodiment of the present invention, a relationship of limited trust is established between the security contexts of the respective communicating entities. The contexts are not fully joined, and the user account lists are not replicated, instead, the security contexts use reduced sets of entities passed to each other to represent themselves. The nature of the limited trust relationship will become evident with further description of other embodiments of the present invention.

D. Entity-Specific Security Token

It is illustratively the responsibility of applications 311/312 to authenticate users and selectively authorize them to use activated web services. It is also desirable, however, that there also be a means for authenticating an application and its entity to the provider of services. In accordance with one embodiment, entity 302 is provided with (e.g., during the registration process) a unique security token 330 that can be utilized (e.g., presented to authentication service 306) to demonstrate entity identity. For example, the web service provider validates a security token with a list of distributed security tokens and their corresponding entities. In accordance with one embodiment, the security token is utilized as the "entity account identifier" described above in Section B.

In accordance with one embodiment, given the described system framework, the information required by the service provider to permit access to activated services illustratively includes at least an entity security token 330 and some form of proof that entity 302 actually does own the account associated with security token 330. In the case where individual users authenticate themselves directly with the web service provider, a password might be adequate. However, in accordance with embodiments of the present invention, the web service provider generally does not authenticate individual users. Depending on the level of security required or desired, security token 330 in and of itself may not be sufficient to guarantee an acceptable level of security because the token could theoretically be compromised while it is stored in database 308. If security token 330 is compromised, it may possibly open unauthorized access to web services. Accordingly, there should be an additional means for enhancing security.

In accordance with one aspect of the present invention, asymmetric encryption, such as but not limited to encryption based on an X.509 protocol, is utilized to further enhance security. Within the X.509 encryption context, confidence in private keys is essentially guaranteed. Accordingly, an X.509 certificate containing a corresponding public key can be considered as evidence of the legitimacy of, for example, a security token 330. As will be discussed below, the present invention contemplates equipping each computer within an entity's local application network with its own respective certificate (e.g., certificates 332, 334 and 344 in FIG. 3) for communication security purposes. An alternative to certificates will also be described below.

E. Machine Activation Protocol

In accordance with one aspect of the present invention, in order to enable remote service functionality, a computing device requires activation. During the activation process, a private/public key pair is created. The public key is provided to registration service 304. In accordance with one embodiment, the public key is accompanied by entity account information (e.g., security token 330). Registration service 304 creates a digital certificate that corresponds to the received public key. In accordance with one embodiment, in order for a certificate to be issued, an authorized (and authenticated) representative of the entity is required to log in. In accordance with another embodiment, a certificate is not issued to a computer not properly associated with the correct entity (e.g., an authorized computing device identification value may be required).

It should be noted that an alternate automatic enrollment process with simplified deployment is also within the scope of the present invention (e.g., for larger local networks). In this alternate process, activation (e.g., certificate creation) is generally automatic and does not require an authorized user to activate each machine individually. However, requiring an authorized user for activation is a more secure alternative.

Each new certificate is transferred to its corresponding computing device and securely stored (e.g., certificates 332 and 334). In accordance with one embodiment, a certificate is stored in Windows Local Machine storage (i.e., making it a machine certificate). In accordance with one embodiment, when registration service 304 generates a certificate, it creates a second unique entity identifier (e.g., a GUID) and stores it in a registration database. The new token illustratively gets embedded into the certificate content along with other information such as the entity name and any other information. This additional identifier will enable an additional means for entity authentication by the provider of services (e.g., a comparison of the identifier with stored values).

In accordance with one embodiment, in addition to obtaining a certificate, each installation of the socket application is required to obtain a "service account" in order to take advantage of services offered by the provider. Each service account is associated with one or more authorized authentication credentials (e.g., MS-Passport credentials) that will subsequently be required to alter account settings and manage service subscriptions. In other words, an owner of the application (or an authorized representative of the owner) creates a service account and binds it to one or more sets of authentication credentials that belong to users authorized to make administrative changes. An authorized user logs into the application (e.g., interacting with a "signup" user interface) using his/her authentication credentials and links the application to the service account that he/she controls. From there, the application is eligible to use services that become activated.

In accordance with one aspect of the present invention, a similar framework is provided with an alternative to certificates. Instead of a certificate, the same framework is implemented in association with a system key—which is illustratively a random string (e.g., a password). The system will associate or bind the system key through modification to represent the related service account (or other entity identifier such as a security token or entity identifier). In this case, an authorized user will log in and submit the system key rather than a certificate. In accordance with one embodiment, the session key is generated by the client application, or is manually entered at the client. In accordance with another embodiment, to enable an additional client-server connection, a unique value is generated by the server and tied to the user/client generated system key.

F. User Access To Web Services

In accordance with one aspect of the present invention, following registration and machine activation, an application user desiring access to remotely provided services logs into application 311 or application 312. The user accomplishes the log-in process through a personal authentication means such as a login name/password, a smart card, etc. The application authenticates the user against a local store of user accounts and picks the corresponding list of privileges from store 320.

When the user requests an application feature that is dependent on an activated web service, the application begins a process of system authentication with authentication server 306 (or with another security subsystem of the web service provider) by submitting an authentication request. Within the authentication request, the application illustratively sends the entity security token 330 (or another similar entity identifier) and the machine certificate (332 or 334) that, in turn, contains the secondary entity ID and the public key. Authentication service 306 validates the certificate (e.g., checks for valid non-expired expiration date, valid issuing Certificate Authority, non-appearance on a revocation list, etc.) and checks if the store token 330 matches the secondary ID. If validation succeeds, then authentication service 306 generates a session ticket and encrypts it using the public key from the submitted certificate. The session ticket illustratively expires after a relatively short period of time (e.g., hours or days), which reduces the likelihood that it will be compromised. The application receives the session ticket, decrypts it with the private key, which is securely stored (e.g., in secured machine storage), and uses the session ticket as an authentication token with subsequently exchanged messages.

As was described previously, a system can incorporate a system key in place of a certificate. Within such systems, once it has been determined that a user is authorized to use a requested service, the system key is retrieved and sent to the authorization service 306 along with a service identifier.

As described, the system key and accompanying data are transferred in an unencrypted state. In accordance with one embodiment, the transfer is accomplished over a secure channel, such as HTTPS or SSL. In accordance with another embodiment, the data is encrypted with a public key before transmission, and is decrypted with a corresponding private key after transmission, the key pair being pre-established in order to secure transfers of security system data. Other encryption techniques (e.g., a static key pair) can alternatively be utilized without departing from the scope or the present invention. It should be noted that these described means for protecting transfers of security-related items can optionally be applied to any transfer of security items described herein, including, but not limited to, transfers of certificates and session tickets.

Authentication service 306 validates the legitimacy of a received system key (e.g., validates its entity association). If validation succeeds, then authentication service 306 generates a session ticket and, optionally, encrypts it using the system key. The session ticket is sent to the application, which, if necessary, decrypts the ticket. The session ticket, which can be set to expire, is used as an authentication token for subsequently sent messages. In accordance with one embodiment, to enable an additional authentication of the entity from which the system key originates, an entity identifier (e.g., a token 330, an entity account identifier, etc. issued during application registration) is transmitted to the authentication service with the system key.

G. Web Service Process Overview

Figure 4:
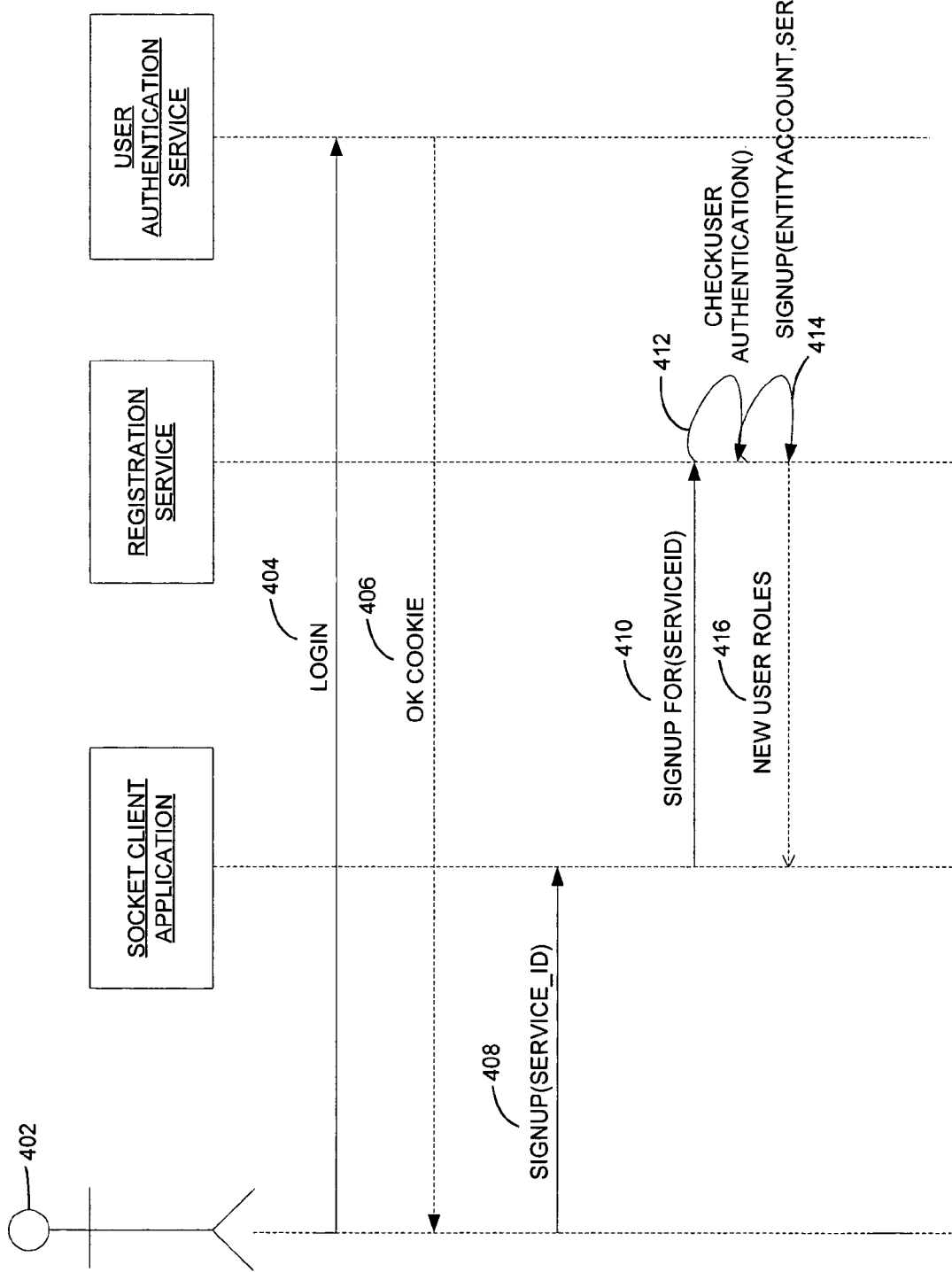
FIG. 4 is a message flow diagram illustrating steps associated with initially setting up a software application for a provision of web services.

FIG. 4, in accordance with one aspect of the present invention, is a message flow diagram illustrating one example of a web service set-up process. In accordance with step 404, user 402, who is illustratively an owner or administrator of a client application, logs in and self-authenticates with a centralized authentication service (e.g., MS-Passport). In accordance with one embodiment, in conjunction with the authentication process, user 402 essentially verifies application ownership (e.g., by way of serial number, etc.), confirms his/her name and address, and expresses an interest in activating available services. User 402 optionally registers his/her authentication information (e.g., his/her MS-Passport account) and thereby becomes an "authorized" administrative user from the perspective of the registration service. The entity with which 402 is associated is illustratively assigned an entity account identification value and/or an entity-specific security token. In accordance with step 406, a cookie is returned to user 402 representing successful completion of the initial login processes.

In accordance with step 408, user 402 sends a request to the client application to activate, or sign-up for, delivery of a web service. User 402's authentication credentials and an identification of a desired service are illustratively sent with the request. In accordance with step 410, assuming user 410 is authorized for administrative tasks, the application forwards the request information to the registration service. In accordance with step 412, the registration service verifies that user 402 is authorized to modify service arrangements. Assuming proper authorization, in accordance with step 414, the registration service activates the desired service or services for the corresponding entity account. In accordance with one embodiment, user roles that correspond to the new services are transmitted to the client application for user/role appropriation by user 402 or some other authorized (and properly authenticated) user.

Although not illustrated, user 402, or some other authorized user, will activate machines on which the application is installed, for example machines connected to a local client network. For activation, for each machine, user 402 self-authenticates with the application (e.g., authenticates through the centralized authentication service) to establish his/her administrative capacity. In accordance with one embodiment, user 402 enters his/her Passport credentials for authentication. Following successful authentication, an unregistered application generates a PKI key pair and submits the public key along with user 402's authentication information (e.g., Passport credentials) to the registration service. The registration service checks the authentication information and, if valid, then creates a digital certificate based on the submitted public key. In accordance with one embodiment, a unique secondary entity identifier (e.g., an identifier for a particular store/shop/business, etc.) is embedded in the certificate and recorded with the registration service for subsequent reference.

The digital certificate is returned to its corresponding application source. In accordance with one embodiment, the certificate is installed in the Windows Certificate Machine Store (i.e., it becomes a machine certificate).

After client application devices in the local network are activated, each activated machine will have its own certificate. Each certificate in the network illustratively has the same secondary entity identifier (e.g., an identifier for a particular store/shop/business, etc.) embedded therein. In accordance with a different embodiment of the present invention, however, a single certificate is alternatively placed in a centralized, shared database. In this case, the registration service generates only one certificate to be shared by all the applications and their associated machines. It should be noted that the centralized certificate framework is less secure but simpler to implement (e.g., administrator need not physically interact with every machine). For some entities, the ease in implementation outweigh the sacrifice in security.

After the client application machines in the local network have been activated, activated web services are then available to the application.

Figure 5:
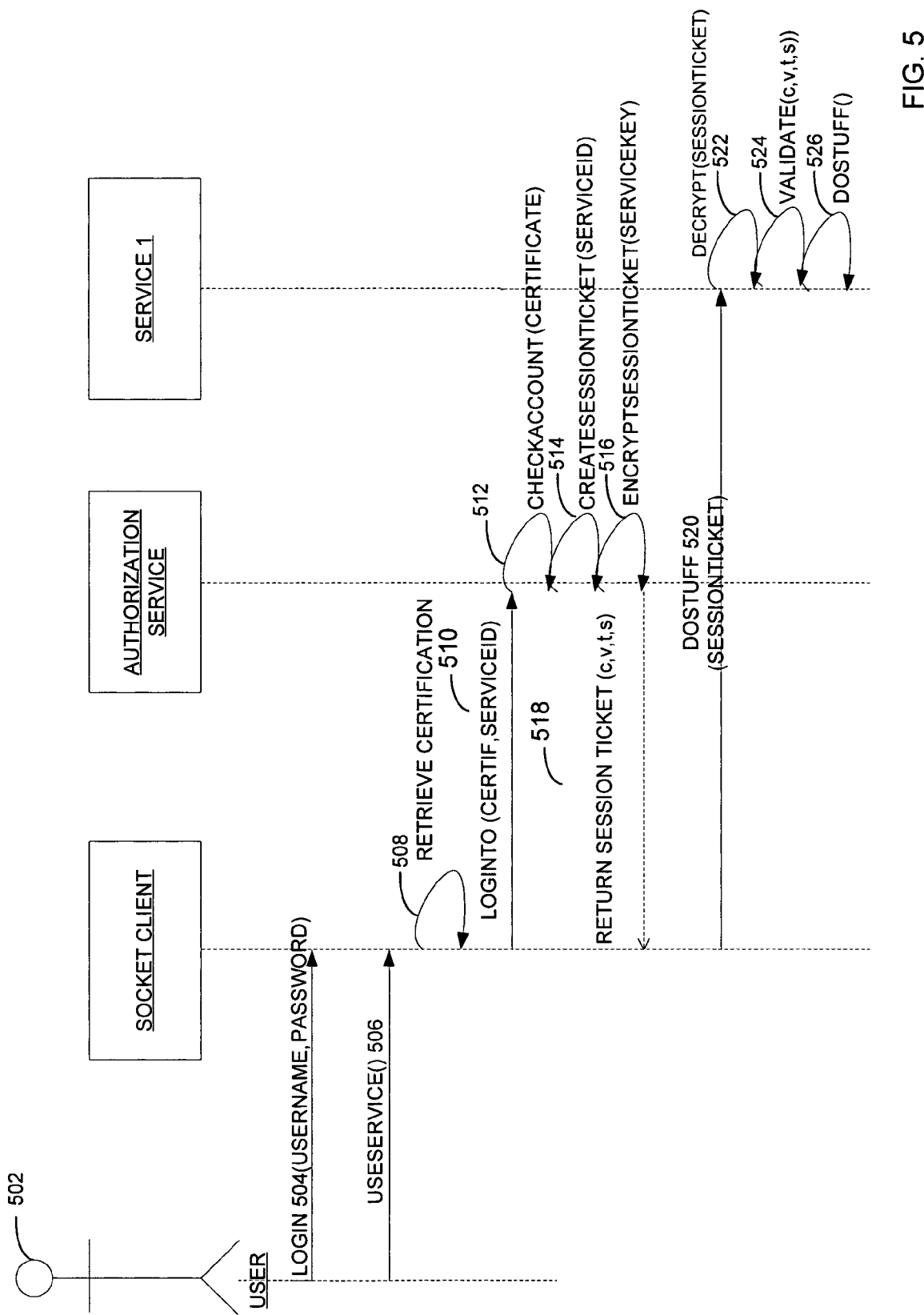
FIG. 5 is a message flow diagram illustrating steps associated with using web service functionality offered through an application interface.

FIG. 5 is a message flow diagram illustrating steps associated with one exemplary process for utilizing an activated web service. In accordance with step 504, a user 502 logs into the application and local authentication takes place. In accordance with step 506, user 502 initiates a function that requires a web service. The client application applies user security privileges as necessary to determine whether user 502 is authorized to use the service. Assuming user 502 is correctly authorized, the application must then be authenticated to the web service provider.

In accordance with step 508, the application retrieves the certificate from its associated machine store. In accordance with step 510, the retrieved certificate is transmitted to the authorization service along with an indication of the requested service and, optionally, its entity security token. In accordance with one embodiment, the authorization service is a web service available on-line.

In accordance with step 512, the authorization service reviews the certificate and identifies the entity associated with the request. When a security token is received, a check is made to ensure that the entity associated with the token is the same as the entity associated with the certificate. The service checks the entity's account and confirms that it is valid and current with regard to the requested service. The service also confirms that the secondary entity identification embedded in the certificate corresponds to appropriate stored values.

Assuming everything is in order, in accordance with step 514, a session ticket is created by the authorization service. In accordance with one embodiment, the session ticket includes:
1) client identification (c)
   e.g., client identifier/IP address
2) time stamp (t)
   time session was created
   session can be set to expire
3) session validity period (v)
4) service identification (s)
   session tickets service specific In accordance with one embodiment, the form of the separately created time stamp AND session validity period are rejected in favor of a more efficient expiration date-time (time-stamp). One possible benefit of the split fields is that a serer could be configured to simply ignore/override a stated validity period—for example to increase or decrease a window of time within which a session ticket is valid. However, this can also be done with the expiration date-time (e.g., actual expiration date becomes stated expiration date minus 1 day, etc.).

In accordance with an optional portion of step 516, the session ticket is encrypted using a service key. A service key is illustratively a key pair shared between the authorization service and the service itself. When a service is created, a new service key is illustratively created and shared with the authorization service. User 502 and the client will generally not know about the service key pair, so they will generally not be able to decrypt a session ticket (i.e., makes spoofing especially difficult).

Regardless of whether or not a service key is utilized, the session ticket is illustratively encrypted with the public key portion of the digital certificate. This generally makes the session ticket available to the associated client because that is where the associated private key is stored (e.g., stored in the windows security store). Accordingly, if the client can decrypt the session ticket, than it is assumed to be a legitimate client to request services from the corresponding application.

The encrypted session ticket is returned to the socket client in accordance with step 518. After the client receives the encrypted session ticket, it is decrypted with the corresponding private key. The session ticket can then invoke the appropriate service to do work in accordance with step 520. In accordance with step 522, the appropriate service key is utilized to decrypt the session ticket if necessary. Then, in accordance with step 524, c,v,t and s data are extracted and validated. If validation is successful, then, in accordance with step 526, the appropriate function is carried out and results are returned to the client as necessary. When user 502 initiates another sequential call to the service, the same session ticket can illustratively be utilized (unless it expires), thereby eliminating repetition of some of the underlying security work. However, if user 502 wants to use another service, he/she will generally need to log in again and create a new session ticket. In accordance with one embodiment, multi-service session tickets are issued to enable access to multiple designated services based on a single access ticket.

Figure 6:
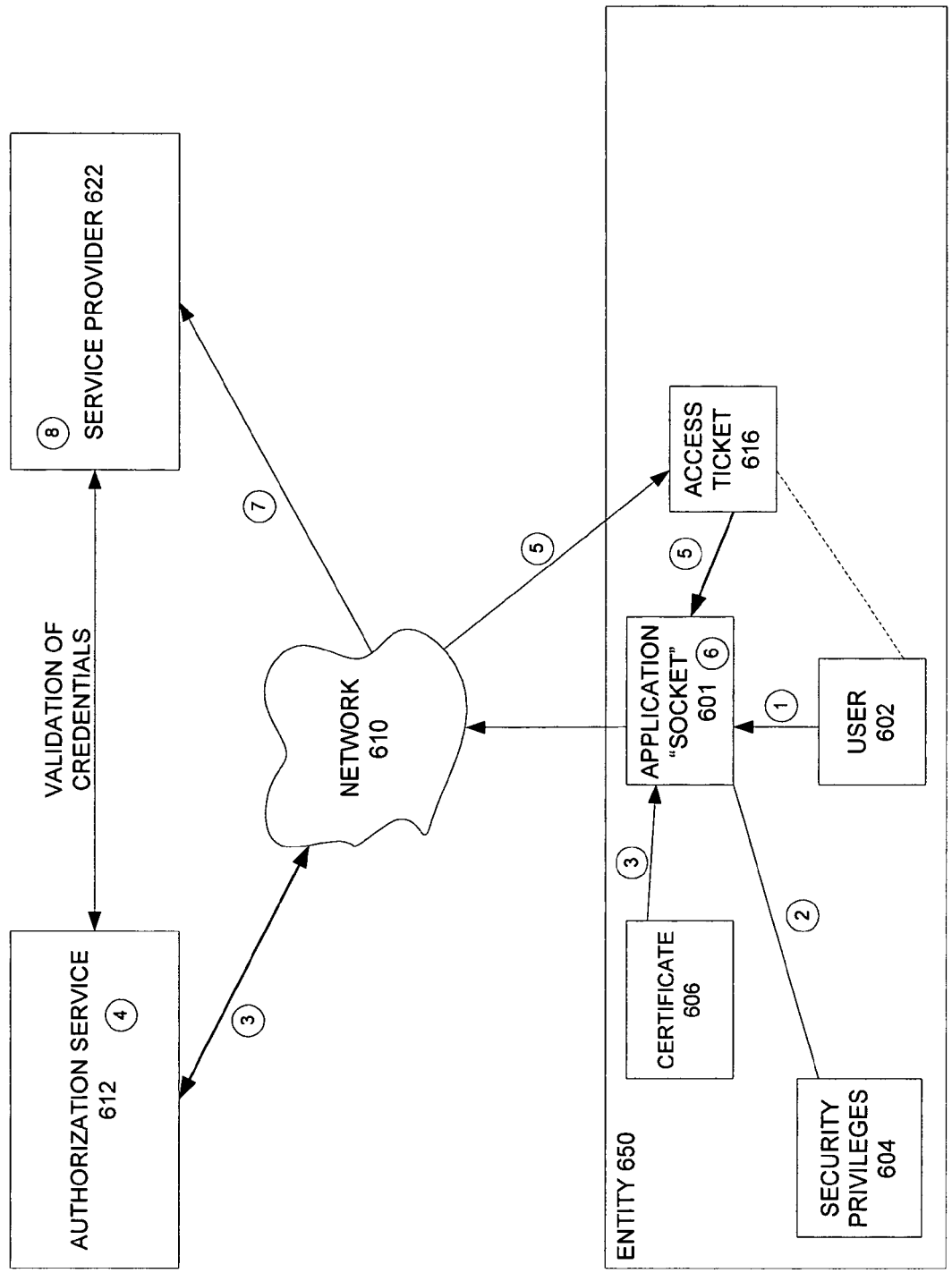
FIG. 6 is a schematic block-flow diagram illustrating steps associated with using web service functionality offered through an application interface.

FIG. 6 is yet another block-flow diagram illustrating another series of steps associated with utilizing an activated web service in accordance with one embodiment of the present invention. The steps are numbered 1-8 for simplicity.

The first step is local authentication of user 602 (associated with entity 650) with application 601. The first step also includes a request to application 601 to use a web service. The second step is application of security privileges 604 as necessary. Assuming user 602 is authorized to use the requested service, the third step is transfer of certificate 606 and an indication of the requested service across public network 610 to authorization service 612. Authentication service 612 performs step 4 by validating account and entity identity information, creating a session ticket, and encrypting the session ticket with the public key in the certificate (and with the service key if necessary). In accordance with step five, the encrypted access ticket (labeled 616), is returned to application 601. In accordance with step six, the session ticket is decrypted with the private key that corresponds to the certificate public key. In accordance with step seven, a command to perform a service task and the decrypted session ticket are transmitted to service provider 622. As explained previously, communication over a secure channel or extra encryption can be implemented to secure this described transfer of security data.

In accordance with step eight, the session ticket is decrypted with the service key if necessary, and validated if necessary. Assuming everything is in order, the requested service is then delivered to user 602 through application socket 601. Service provider 622 can optionally validate credentials (e.g., user login credentials and otherwise) with authorization service 612 for further assurances.

Figure 7:
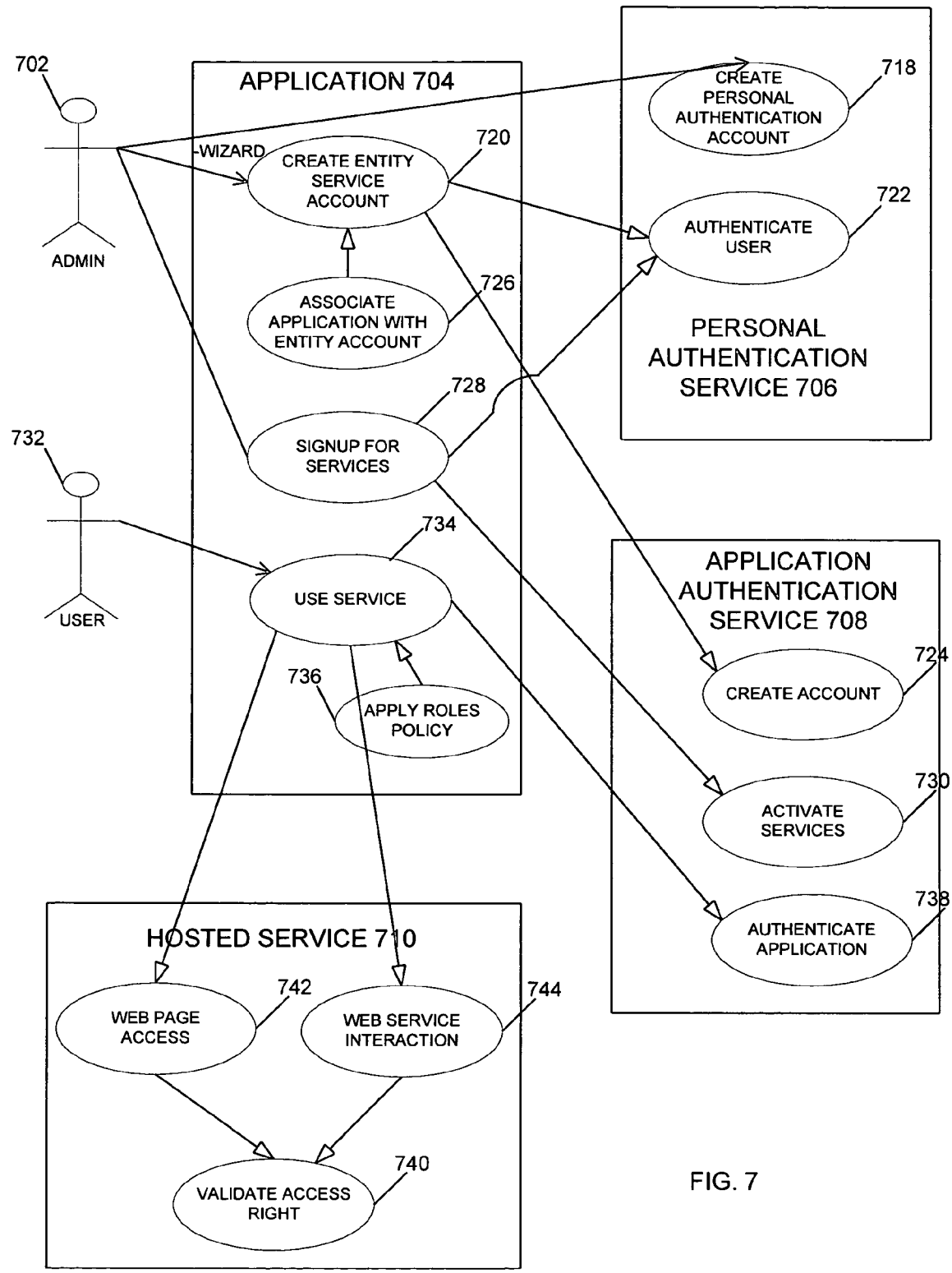
FIG. 7 is a UML use case diagram illustrating a remote service provider environment with security enhancements.

FIG. 7 is a UML use case diagram illustrating a web service environment in accordance with one embodiment of system framework associated with the described security protocol. The FIG. 7 architecture includes a socket application 704 configured for interaction with a personal authentication service 706 and an application authentication service 708. Services 706 and 708 illustratively operate in the context of enabling secure communications with a web service provider 710.

In accordance with item 718, an administrative user 702 interacts with a centralized personal authentication service 706 (e.g., MS-Passport with a web user interface) to create a personal authentication account. In accordance with item 720, assuming successful personal authentication is carried out in conjunction with items 722 and 724, an entity service account is created. The entity service account is generally associated with activities regarding the usage of services offered by provider 710, and can also be used for entity identification. Within the account creation process (or separately), administrator 702 associates the application installation with the entity service account, which, in effect, enables application to utilize offered services.

Before using any service, administrator 702 must sign up for activation (728). Because the application administrator 702 generally must authorize account creation and service activation in person, authentication is carried out in association with personal authentication service 706. In accordance with item 730, an indication of service settings goes to application authentication service 708 for service activation/deactivation purposes.

A user of application 704 is generally allowed to use activated services according to the security rules/groups 736 to which they belong. In accordance with item 734, a user 732 logs in with application 704 and requests use of a service. Application roles policy 736 is applied to user 732's user account to determine whether the user is authorized to use the requested service. Assuming the user is authorized, in accordance with item 738, application 704 is authenticated. In accordance with one embodiment, during the 738 process, a certificate or entity key created during creation of account at 720/724 is exchanged to enable creation of usable session token as described herein. The 738 process illustratively validates access rights in association with item 740 identified with web service provider 710. Assuming the application and user 732 are authorized to user a requested service, web pages are accessed interacted with in accordance with items 742 and 744.

It should be noted that any of the activities noted in the FIG. 7 illustration could be done out of band without departing from the scope of the present invention. For example, an account can alternatively be created, and/or a service signed up for, on a web site without entering the application.

H. Secure Peer-to-peer Communication

The communication security systems of the present invention enable intercommunicating applications to identify one another, restrict data access and secure transfers of data. In accordance with another aspect of the present invention, the described security infrastructure is extendable to peer-to-peer scenarios. For example, the described digital certificate system implemented with applications 311/312 (FIG. 3) also provides the foundation for facilitating secure communication with application 344, which is associated with entity 310.

Entity 310 illustratively implements communication security technology that enables application-to-service-provider communication in a manner substantially similar to that described in relation to entity 302. A unique security token 340 is generated for entity 310 and stored in a database 348. Entity 310 sets its user security privileges 350 and stores them in database 348. Application 314 includes a digital certificate 344 that is generated for its own entity 310.

For the purpose of illustration, it will be assumed that it is desired to establish secure communication (e.g., sending and receiving secure messages) between application 312 and application 344, which are illustratively two applications implemented on different local networks. One option would be for the applications to communicate utilizing HTTPS (Hypertext Transfer Protocol Secure) methods. However, certificates for the HTTPS protocol can be cost prohibitive. Instead, in accordance with one aspect of the present invention, the same certificates generated for web service communication (e.g., certificates 332, 334 and 344) can be utilized to enable secure peer-to-peer communication.

Figure 8:
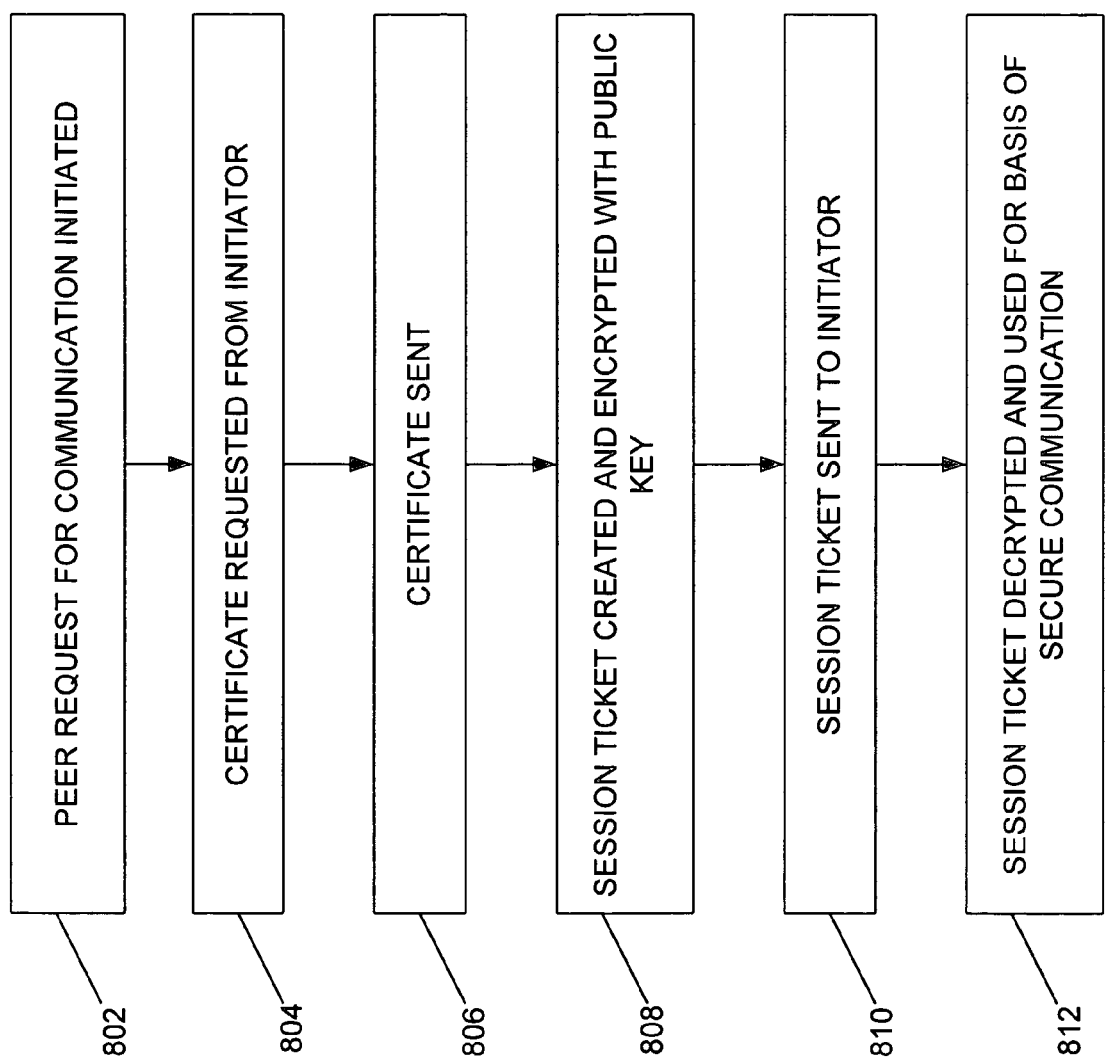
FIG. 8 is a flow chart illustrating steps associated with enhancing security for peer-to-peer communication between applications.

FIG. 8 is a flow chart illustrating steps associated with enabling secure peer-to-peer communication within the described security framework. In accordance with step 802, a first application transmits a request for communication to a second application. In accordance with step 804, the second application desires confirm of identity and therefore requests the first application's certificate. In accordance with step 806, the certificate is transferred to the second application. The certificate illustratively contains an entity ID, the entity's name, and any other in identification-enabling information for which the security system has been adapted to accommodate.

In accordance with the method, the second application does not place complete trust in the information contained in the certificate. Instead, the information is checked for validity. Accordingly, in accordance with step 808, the second application creates a session ticket (e.g., an arbitrary sequence/string, a GUID, etc.) and encrypts it with the public key contained in the certificate. In accordance with step 810, the encrypted session ticket is sent back to the first application. In accordance with step 812, the second application decrypts the session ticket with the corresponding private key. As the applications have now exchanged the session ticket, they can use it as a symmetric cryptography key for encrypting messages within the ensuing communication session. The session ticket will illustratively expire after a predetermined amount of time has passed. Accordingly, in order to establish secure peer-to-peer communications, a certificate and a corresponding private key are required.

In accordance with one embodiment, the second application is configured to interact with an authentication or certificate creation service (e.g., service 306 in FIG. 3) to validate the first application's identity on the fly by validating its certificate. In other words, the second application can validate the first application's certificate by "looking up" the entity id, entity name, etc. with the authentication or certificate creation service.

Within the described peer-to-peer framework, user security privileges (e.g., 350 and 320 in FIG. 3) can be utilized as a basis for policing which users (or user roles) are permitted to take advantage of application functionality that incorporates communication with other peer applications. Further, communication with certain peers can illustratively be limited to certain users or user roles. In accordance with one embodiment, limitations can also be placed on the amount, types and/or nature of data that is available to be shared between applications. For example, assuming that session ticket communication between applications has been established, one application may be restricted to accessing only a limited type of data from the other (e.g., inventory data is available but business data is not, etc.). These limitations can be implemented as part of the privileges 320/350 type architecture or otherwise. Accordingly, the present invention includes defining and implementing security policies that prescribe different data access restrictions for different partners, and applying those policies to incoming requests from identified and authenticated sources.

In accordance with one embodiment, peers can become aware of the opportunity to communicate with other peers through an advertising directory such as a hosted web service, through email advertising, through instant messaging, etc. Generally speaking, an entity initiating communication will know an address (e.g., an IP number or URL) for an entity with which communication is desired.

IV. Conclusion

Accordingly, the present invention at least provides methods and systems to enhance the security of access and communications between applications (e.g., within a local area network) and web service providers that are communicably linked to one another via a public network. The invention further provides corresponding security enhancements for access and communication within peer-to-peer environments. In the web service context, presently described embodiments enable security of sensitive information to be maintained while at the same time optimizing performance (e.g., by reducing round-trips, data transfer and latency) of services hosted over a public network by a service provider or an associated partner (or within an intranet or LAN).

With regard to web service communication with software applications, embodiments of the present invention are beneficial at least because a user need only login with an application to gain access to a service (e.g., a second login with service provider is generally not required). In other words, one login with the application is capable of enabling automatic login to the service provider.

Another benefit of certain embodiments is that solutions provided herein are generally scalable. Some entities will desire a selection of strong passwords while others will not (e.g., some entities may prefer an ability to change users very quickly). Accordingly, entities can select a level of security they want through password selection. Also, the described ability to assign attributes to specific users or user roles enables additional scalability.

It should be noted that the systems and methods for communication security described herein can be applied to any application-type security interface without departing from the scope of the present invention. Also, without departing from the scope, the same systems and methods could be applied to enable communication security for any non-application-type security interface, such as any client accessing a server, any client-host situation, or any peer-to-peer communication interaction. Although the present invention has been described with reference to illustrative embodiments, workers skilled in the art will recognize that changes may be made in form and detail without departing from the spirit and scope of the invention.

What is claimed is:

1. A computer-implemented method for enhancing the security of communication over a network, the method comprising:

receiving a set of authentication credentials from a user;

receiving from the user a request that requires communication over the network with a remote system;

applying a collection of security privileges to the set of authentication credentials to determine if the user is authorized to carry out the request wherein applying comprises applying based at least in part upon a role-based determination that involves referencing a record that assigns access privileges to various roles that can be assumed by the user;

selectively transmitting a security certificate over the network to the remote system, the certificate containing a public key;

receiving from the remote system a session ticket that has been encrypted with the public key;

decrypting the session ticket with a corresponding private key;

using the session ticket as an authenticator for subsequent communications with the remote system;

wherein the remote system is a service provider configured to extend the functionality of a software application by remotely providing a service, and wherein selectively transmitting therefore comprises selectively transmitting the security certificate to the service provider;

wherein receiving from the user a request comprises receiving from the user a request for delivery of the service provided remotely by the service provider;

wherein selectively transmitting comprises transmitting only when the collection of security privileges indicates that the user is authorized to receive the service provided remotely by the service provider;

wherein using the session ticket comprises using the session ticket to secure communication associated with the service provider extending the functionality of the software application; and wherein receiving a set of authentication credentials comprises receipt of the authentication credentials by a first computing device, the first computing device being the same computing device upon which operates the software application that receives the extended functionality from service provider, and wherein the first computing device is the same computing device upon which the role-based determination is made, the record that is referenced as part of that determination being stored on the first computing device, and wherein selectively transmitting a security certificate to the service provider further comprises transmitting the security certificate from the first computing device to the service provider, and wherein using the session ticket to secure communications further comprises using the session ticket to secure direct communications between the service provider and the first computing device.

2. The method of claim 1, wherein using the session ticket comprises using the session ticket without requiring the user to re-submit the set of authentication credentials.

3. The method of claim 1, wherein using the session ticket comprises using the session ticket until it expires.

4. The method of claim 1, wherein:

selectively transmitting a security certificate to the remote system comprises selectively transmitting a security certificate to a remote application configured to extend the functionality of a software application by providing access to information; and receiving from the user a request comprises receiving a request for access to the information.

5. The method of claim 1, wherein selectively transmitting a security certificate comprises selectively transmitting a security certificate that contains an embedded indication of the identity of an entity associated with which the user is associated.

6. The method of claim 1, wherein applying a collection of security privileges further comprises applying access rights that are distributed relative to a plurality of user accounts.

7. The method of claim 6, wherein applying a collection of security privileges comprises applying access rights based at least in part upon a determination of which roles are assigned to a user account associated with a user.

8. A computer-implemented method for enhancing the security of communication over a network, the method comprising:

receiving a set of authentication credentials from a user;

applying a collection of security privileges to the set of authentication credentials to determine if the user is authorized to carry out a request wherein applying comprises applying based at least in part upon a role-based determination that involves referencing a record that assigns access privileges to various roles that can be assumed by the user;

generating a public key and a corresponding private key;

storing the private key;

transmitting the public key over the network to a registration service;

receiving from the registration service a security certificate that includes the public key;

transmitting the security certificate over the network to an entity with which a channel of communication is desired;

receiving from the entity a session ticket encrypted with the public key;

decrypting the session ticket with the private key;

using the session ticket as an authenticator for subsequent communications with the entity, wherein using the session ticket comprises using the session ticket as a cryptography key for encrypting or decrypting messages;

wherein receiving a session ticket from the entity comprises receipt of the session ticket by a first computing device;

wherein decrypting the session ticket with the private key is a function that occurs via processing executed by the first computing device;

wherein using the session ticket as an authenticator further comprises using the session ticket as an authenticator for subsequent communications between the entity and the first computing device; and wherein transmitting the security certificate over the network comprises transmitting the security certificate to a service provider configured to extend the functionality of a software application by remotely providing a service.

9. The method of claim 8, wherein using the session ticket comprises using the session ticket to secure communications with the service provider.

10. The method of claim 8, wherein transmitting the security certificate over the network comprises transmitting the certificate to a remote peer.

11. The method of claim 10, wherein transmitting the security certificate over the network comprises transmitting the security ticket from a first application host to a second application host.

12. A computer-implemented method for enhancing the security of communication over a network between multiple peer application hosts, the method comprising:

receiving a set of authentication credentials from a user;

applying a collection of security privileges to the set of authentication credentials to determine if the user is authorized to carry out a request wherein applying comprises applying based at least in part upon a role-based determination that involves referencing a record that assigns access privileges to various roles that can be assumed by the user;

receiving a security certificate from a first application host;

transmitting the security certificate over the network to an entity with which a channel of communication is desired;

generating a session ticket;

encrypting the session ticket with a public key contained in the security certificate;

transmitting the session ticket to the first application host;

receiving a message from the first application host, the message being at least partially encrypted in accordance with the session key prior to its being encrypted with the public key;

wherein said steps of receiving a security certificate, generating, encrypting, transmitting, and receiving a message are all conducted via processing by the same computing device; and wherein transmitting the security certificate over the network comprises transmitting the security certificate to a service provider configured to extend the functionality of a software application by remotely providing a service.

13. The method of claim 12, further comprising:

generating a response message;

encrypting the response message; and transmitting the message to the first application host.

14. The method of claim 12, further comprising authenticating the certificate.

15. The method of claim 12, wherein authenticating the certificate comprises interacting with an authentication service to validate an expression of the first application host's identity.

* * * * *